July 4, 1939.   H. W. LEVERENZ   2,164,533
LUMINESCENT MATERIALS
Filed Aug. 29, 1936
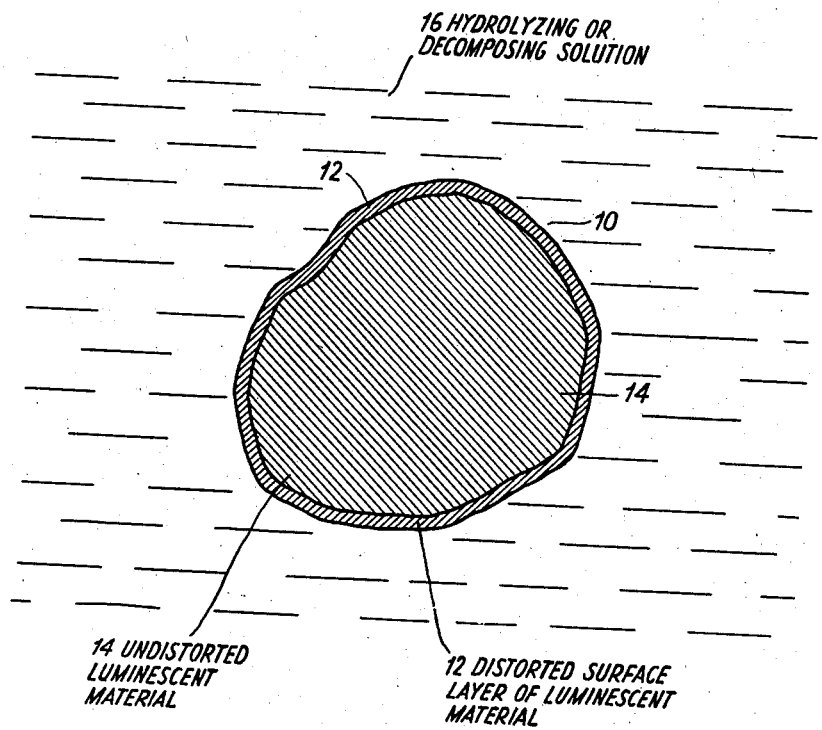
INVENTOR
HUMBOLDT W. LEVERENZ
BY
ATTORNEY Patented July 4, 1939

2,164,533

UNITED STATES PATENT OFFICE 2,164,533

LUMINESCENT MATERIALS

Humboldt W. Leverenz, Collingswood, N. J., assignor to Radio Corporation of America, a corporation of Delaware Application August 29, 1936, Serial No. 98,454

17 Claims. (Cl. 250—81)

My invention relates to luminescent materials and, in particular, to the method and means of improving the qualities and characteristics of such materials for use in making luminescent screens such as are used for example in cathode ray tubes for television reception.

This invention is a continuation in part of my co-pending application Serial No. 8654, which was filed February 28, 1935, and entitled "Luminescent material."

In the final step of making luminescent material of the character referred to, one form of which is commonly referred to as synthetic willemite, the material is ground in a ball mill to a fine powder such that the particles will pass through a screen of the order of 200 to 400 mesh per linear inch. The finely divided luminescent material is then applied to the end wall of the cathode ray tube in any suitable manner such as by spraying, application to the surface with a brush, settling out of air upon the surface, or settling onto the surface out of suspension in a liquid. A screen thus formed has been found to have certain limitations in the way of its resistance to burning by the cathode ray, and its luminescent efficiency in terms of candle power per watt. I have attributed these limitations to a condition or effect which apparently takes place during the comminution or grinding of the material. That is, the outer surfaces of the individual particles are distorted, or are in an unnatural crystalline condition, which apparently accounts for the fact that the luminescent efficiency of the outside layers of the individual particles is less than that of the interior portions of the particles.

I have attributed this decrease in desirable qualities and characteristics of screen prepared by other than my invention to the fact that the material must be treated in general by grinding or by comminution in order to provide very fine particles such as are used for the purpose of making screens. The usual particle size is such as to pass through very fine sieves on the order of 200 to 400 mesh per linear inch. The comminution or grinding apparently causes distortion of the outer surfaces of the individual particles or may possibly cause an abnormal or unnatural crystalline condition of surface layer of the particle.

I have discovered that by removing the distorted or abnormal crystalline outer surface of the particles, that the physical properties and characteristics of the finely divided luminescent material is improved, and my invention provides means and methods of removing the surface layer of fine particles of luminescent materials to improve the qualities thereof and consequently makes possible improved luminescent screens.

In order to overcome the deleterious effects of the distorted layer, I remove chemically the relatively inactive surface layer of the particles of the luminescent material. In accordance with my invention, finely divided luminescent material is placed in a hydrolyzing or decomposing solution of sufficient concentration and for a time period sufficient to permit hydrolysis or decomposition to take place to a depth measured from the surface, substantially equal to the thickness of the distorted or relative inactive surface layer of the finely divided luminescent material. In this manner, the deleterious surface layer is dissolved away or otherwise removed to leave the minute, finely divided particles of luminescent material with an undistorted active surface.

Such improved screens as are provided by my invention are useful for converting radiant energy into luminous energy and are employed for use with X-rays, electron microscopes, image multipliers, and cathode ray tubes. Probably the widest use today is in conjunction with cathode ray tubes wherein a concentrated beam of electrons impinges upon a screen of luminescent material under the control of electrical energy, as for example in electro-optical measuring and signalling systems. It will therefore be appreciated that by improving the luminescent efficiency of the screen and increasing the luminescent material's resistance to burning under cathode ray bombardment, this invention serves to advance the art.

With the foregoing in mind, it is one of the objects of my invention to provide an improved method of making a luminescent material of the character referred to whereby the same has advantages over such materials made heretofore in the way of higher resistance to burning by the cathode ray and higher or greater luminescent efficiency.

Another one of the objects of my invention is to provide a method and means of improving the physical characteristics and qualities of luminescent materials.

Another object of my invention is to provide chemical methods and means to improve comminuted luminescent materials.

A still further object of my invention is to provide method and means for chemically improving the luminescent efficiency and resistance under bombardment to burning of luminescent materials.

A still further object of my invention is to provide method and means for removing relatively inactive surface layers of crystalline luminescent materials.

Another object of my invention is to chemically remove or alter the usually non-luminescent or only feebly luminescent outer layers of comminuted chemically-combined inorganic luminescent materials.

Yet another object of my invention is to treat finely comminuted luminescent materials with easily volatilized weak basic or acid solutions so as to improve their physical characteristics and properties to increase their luminescent efficiency as well as their resistance to burning under the influence of radiant energy.

Another object of my invention is to provide a luminescent screen which shall have improved luminescent properties resulting from chemically treating the comminuted luminescent material used in preparing the screen.

Other objects and advantages will hereinafter appear.

In accordance with my invention, the finely divided luminescent material is placed in a hydrolizing or decomposing acid or alkaline solution of sufficient concentration and for a period sufficient to cause hydrolysis to take place to a depth from the surface substantially equal to the thickness of the distorted or relatively inactive surface layer referred to, whereby such layer or film is dissolved away or otherwise removed to leave the minute particles of the material with an undistorted surface.

My invention resides in the improved method of the character hereinafter described and claimed.

The figure of drawing is a schematic, sectional view, greatly enlarged, of a particle of luminescent material, illustrative of the action which is believed to take place in carrying out my invention.

The concentration and type of solution may vary widely depending upon the type and composition of the luminescent material, as well as the rate at which it is desired to remove the surface layer 12 of the material. The rate at which the surface layer 12 is removed and in consequence, the time required to effect the treatment of the luminescent material in accordance with my invention, are, of course, a matter of experience as well as analytical consideration. Since they depend not only upon the type of solution used, whether acid or alkaline, the concentration of the solution, and the particular luminescent material being treated, but also, to some extent, upon the method used to grind or comminute the material as will be well understood.

After the finely divided luminescent material has been in the solution for the requisite time to remove the disturbed or non-efficient layer 12 and leave the undistorted particle 14, the action is terminated by decantation of the solution 16, or by filtering the treated particles from the solution, or by evaporation. The treated particles are then gently dried by application of heat or by simple exposure to the atmosphere. The dried treated particles are then applied to a supporting surface to form a luminescent screen. It will be found that screens so prepared will have greater or higher luminescent efficiency than screens prepared without the additional treatment, in accordance with my invention explained above. In particular, it will be found that screens, prepared by my method for use in cathode ray tubes, will have a greater resistance to burning by the bombardment of the cathode ray, that is, the deterioration of the luminescent efficiency of the screen is less, and accordingly, the useful life of the screen is prolonged.

In order to prevent contamination of the treated particles by the hydrolyzing or decomposing solution, it is desirable that all traces of the solution be removed by the step of heating or evaporation to prevent the reagent used from depositing upon the particles.

To avoid using high temperatures, which may affect the treated luminescent material adversely, and still rid the treated particles of the treating solution, I use a solution of an easily volatilized base, acid, preponderantly basic salt, or preponderantly acid salt. The use of such a solution insures lack of contamination of the treated particles of luminescent materials in their final state before application to form a screen without the danger of having their physical characteristics altered by the temperature's rise used in drying the particles.

In the drawing, the reference numeral 10 designates a minute particle of luminescent material such as may be made synthetically in the manner disclosed in my co-pending application Serial No. 707,866, filed January 23, 1934. Considering a specific case, the material will be considered to be a form of synthetic willemite, identified as zinc orthosilicate wherein metallic manganese is entrained as an activator. The formula

$$Zn_2SiO_4:Mn$$

has been assigned to this particular form of synthetic willemite.

It will be understood that in the above formula the colon indicates that the phosphor $Zn_2SiO_4$ is activated by the metal Mn. That is to say, the colon merely indicates that a small amount of the element following the colon acts as an activator and is held in physical bond with the material which precedes the colon. The activator serves to greatly increase both the efficiency and intensity of luminescence of the material, as is well known in the art.

Each of the particles of the finely ground luminescent material apparently has a surface film or outside layer 12 whose thickness is of the order of several atomic diameters, and which is "distorted", or at least which has an unnatural or abnormal crystalline form, probably caused or formed during the comminution or grinding of the material into the fine particles thereof. I have determined that the luminescent efficiency of this outside layer 12 of each particle is substantially less than that of the interior "undistorted" portion 14.

Coming now to the carrying out of my improved method with respect to the chosen example, synthetic willemite, I propose to place the finely divided luminescent material in an alkaline solution 16. I propose to use a mildly alkaline solution of some easily volatilized base or preponderantly basic salt such as ammonium hydroxide, $NH_4OH$, or ammonium carbonate, $(NH_4)_2CO_3$.

Satisfactory results have been obtained by using five normal ammonium hydroxide, and leaving the minute particles of the luminescent material in the same for about 24 hours. However, the concentration of the alkaline solution may vary widely, depending upon the particular silicate or other luminescent material being worked with. The time required for the desired action to take place is more of a matter of experience, and depends upon the concentration of the alkaline solution and the nature of the particular material being worked with, as will be well understood.

After the finely divided luminescent material has been in the alkaline solution for the required time, the action is terminated by decantation of the solution and/or evaporation, leaving the undistorted crystals or particles. That is, the distorted surface of the individual particles will have been removed, and when the particles are applied to the end of the tube to form a screen, the same will be found to have greater resistance against burning by the cathode ray and to have, also, higher or greater luminescent efficiency than screens made of the finely ground luminescent efficiency than screens made of the finely ground luminescent material without the additional treatment as explained above.

The hydrolyzing or decomposing action which results in the improvements or advantages referred to may be accounted for in any one or more of the following ways, most advantageously by considering a specific example of luminescent material, such as zinc orthosilicate activated by entrained manganese.

In what follows, it will be understood that by hydrolysis is meant an ordinary double decomposition or metathesis where water is one of the reagents and wherein another reagent may be present.

Surface hydrolysis of the individual particles may take place in the alkaline solution, the reaction proceeding as represented by the following Equation A it being understood that the equation is merely illustrative of the reactions taking place and do not necessarily represent molecular proportions.

(A) 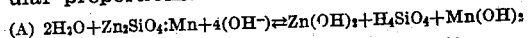

Another explanation is that the reaction may be reversible, as indicated by Equation A, whereupon, after hydrolysis takes place throughout the distorted outside layer of the individual particles, the separate molecular constituents of the luminescent material may recrystallize upon the surfaces of the individual particles, which are then undistorted, to form a new layer or to build upon the particle surface as an undistorted crystalline layer.

Another explanation of the action which takes place may be that silica, $SiO_2$, may be redeposited or precipitated out from the solution upon the surfaces of the individual particles, according to the following Equation B, to form a strong enclosing layer about each particle.

(B)     $H_4SiO_4 \rightleftharpoons SiO_2\downarrow + H_2O$

From the foregoing it will be seen that I have developed an improved method of making luminescent material of the character referred to by which undesirable characteristics, which may arise during comminution or grinding of the material into minute particles thereof are removed or eliminated whereby the material is caused to have substantially greater resistance to burning by the cathode ray and/or a substantially greater luminescent efficiency than similar material which does not undergo the treatment in accordance with my invention.

It is to be understood that although only one specific example of a luminescent material has been cited, my invention may be used to improve any and all chemically-combined inorganic luminescent materials and is particularly adapted for use with such materials in crystalline form, as for example, such widely diverse luminescent materials as cadmium phosphate, zinc sulphide, uranyl fluoride, calcium sulphide, and zinc carbonate.

Likewise it should be noted that my invention is not restricted to solutions of ammonium hydroxide or carbonate, but that any easily volatilized mildly acid or alkaline solution suitable for hydrolyzing or decomposing inactive surface layers of minute particles of luminescent materials may be used. Examples of other easily volatilized aqueous alkaline solutions are: ammonium sulphide ($(NH_4)_2S_x$), tetramethylammonium hydroxide ($N(CH_3)_4OH \cdot 5H_2O$) and aqueous solutions of the amines (organic base) such as ethyl amine ($C_2H_5NH_2$).

As an example of a suitable easily volatilized mildly acid solution, carbonic acid ($H_2CO_3$) may be used with an appropriate luminescent material to remove the relatively inactive surface layer of luminescent particles produced by comminution. Other examples of easily volatilized aqueous acidic solutions are: nitric ($HNO_3$), hydrochloric ($HCl$), phosphoric ($H_3PO_4$), oxalic

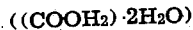

and hydrosulphuric acids ($H_2S$).

My invention is applicable to even very soluble luminescent materials, as for example, cadmium phosphate and zinc sulphate, since the time of exposure of the material may be made to vary inversely as the solubility of the solute luminescent material, as was pointed out above in discussing my invention and the factors determining the duration of exposure.

Further, in my invention, it should be appreciated that it is not necessary to first treat the particles as pointed out above, and then as a separate step, apply the particles to the supporting screen. Where it is desired, the hydrolyzing or decomposing solution may be, for example, placed in a tube blank, for example, the conical shaped tubes with a neck-portion such as are commonly used in manufacturing cathode ray tubes. By positioning the tube so that the relatively large base of the conical section is face down with the neck portion up, the hydrolyzing solution may be poured into the tube. The particles of untreated comminuted luminescent material may then be introduced and stirred up in the solution. Upon standing, the particles will settle out upon the large base surface, which constitutes, as is usual in such types of tubes, the supporting structure for the screen. When a sufficient number of particles have settled out to give the desired or required thickness of luminescent material on the face or end wall of the cathode ray tube, the remaining solution is carefully decanted and heat is applied gently to dry the particles. Upon drying, it will be found that the particles adhere to the glass surface sufficiently well to constitute a luminescent screen which will have the desirable properties and qualities which I have pointed out above. By this method of treatment, the intermediate step of having to apply the treated luminescent materials is overcome with a consequential saving in labor, costs and time.

It will be understood that modifications, within the conception of those skilled in the art, are possible without departing from the spirit of my invention or the scope of the claims.

Having described my invention, what I claim as new and desire to secure by Letters Patent is:

1. In the art of making luminescent material, the method of operation which comprises placing in an easily volatilized alkaline solution particles of a metallic silicate activated by a metal to improve the characteristics of the particles of becoming luminescent upon being bombarded by electrons, subsequently removing the solution, and then drying the particles.

2. As a new article of manufacture, comminuted inorganic luminescent material, each particle of which has been subjected to the action of an easily volatilized hydrolyzing solution, and subsequently dried.

3. As a new article of manufacture, comminuted inorganic luminescent material, each particle of which has been subjected to the action of an easily volatilized alkaline solution, and subsequently dried.

4. As a new article of manufacture, comminuted inorganic luminescent material, each particle of which has been subjected to the action of an easily volatilized acid solution, and subsequently dried.

5. As a new article of manufacture, comminuted inorganic luminescent material, each particle of which has been subjected to the action of a solution of ammonium hydroxide and subsequently dried.

6. As a new article of manufacture, comminuted inorganic luminescent material, each particle of which has been subjected to the action of a solution of ammonium carbonate and subsequently dried.

7. As a new article of manufacture, comminuted manganese activated zinc orthosilicate, each particle of which has a surface resulting from action thereon of an easily volatilized alkaline solution.

8. In the art of making chemically combined inorganic luminescent materials wherein the material has a stressed crystalline surface, the method of improving the characteristics of the luminescent material which includes the step of hydrolyzing the surface by a solution chosen from the group consisting of easily volatilized acid and alkaline aqueous solutions to alter the physical properties of the surface while maintaining the chemical properties of the surface unchanged.

9. In the art of making chemically combined inorganic luminescent materials, wherein the luminescent material possesses a stressed crystalline surface, the method of improving the characteristics of the luminescent material which includes the step of decomposing the surface by an easily volatilized hydrolyzing solution.

10. In the art of making chemically combined inorganic luminescent materials, wherein the luminescent material possesses a stressed crystalline surface, the method of improving the characteristics of the luminescent material which includes the step of decomposing the surface by an easily volatilized alkaline solution.

11. In the art of making chemically combined inorganic luminescent materials, wherein the luminescent material possesses a stressed crystalline surface, the method of improving the characteristics of the luminescent material which includes the step of decomposing the surface by an easily volatilized acid solution.

12. In the art of making chemically combined inorganic luminescent materials wherein the material has a stressed surface layer, the operation which comprises immersing the material in an easily volatilized hydrolyzing solution to decompose the surface layer of the material, decanting the solution, and drying the resultant material.

13. In the art of making chemically combined inorganic luminescent materials wherein the material has a stressed surface layer, the operation which comprises immersing the material in an easily volatilized alkaline solution to decompose the surface layer of the material, decanting the solution, and drying the resultant material.

14. In the art of making chemically combined inorganic luminescent materials wherein the material has a stressed surface layer, the operation which comprises immersing the material in an easily volatilized acid solution to decompose the surface layer of the material, decanting the solution, and drying the resultant material.

15. In the art of making inorganic luminescent material which initially possesses a relatively inactive surface layer, the method of operation which comprises hydrolyzing the material in an easily volatilized alkaline solution of sufficient concentration and for a period sufficient to affect the material to a depth from the surface substantially equal to the thickness of a relatively inactive surface layer.

16. In the art of making inorganic luminescent material which initially possesses a distorted crystalline surface, the method of operation which comprises placing particles of the material in an easily volatilized alkaline solution for a time duration sufficient to affect only the physical properties of the distorted crystalline surface and subsequently removing the solution.

17. In the art of making inorganic luminescent material initially in the form of particles coated with a stressed crystalline surface film, the method of operation which comprises dissolving in an easily volatilized hydrolyzing solvent, substantially the entire surface film of the particles, and subsequently removing the solvent to leave the material in the form of particles, each of which is in a substantially normal form throughout.

HUMBOLDT W. LEVERENZ.